July 19, 1955 F. SMARDO 2,713,492

RECORD CHANGER

Filed March 17, 1951

INVENTOR.
Frank Smardo,
BY
Foorman L. Mueller
Atty.

2,713,492

RECORD CHANGER

Frank Smardo, Chicago, Ill., assignor to Motorola, Inc., Chicago, Ill., a corporation of Illinois Application March 17, 1951, Serial No. 216,155
3 Claims. (Cl. 274—10)

This invention relates to automatic record changing apparatus, and particularly to apparatus in which the same mechanism is utilized to change records of different sizes and types.

Record changers for standard 10 and 12 inch records designed to run at 78 R. P. M., have been proposed in which a stack of records is supported at its center on an offset center spindle and at its edge portion on a relatively narrow horizontal ledge. Records are fed from the bottom of the stack by a push-off finger which engages the edge of the bottom record and pushes it off of the ledge and shoulder so that it can drop down onto the turntable.

This type of changer has not been used satisfactorily with thinner records such as the conventional 7 inch records designed for operation at 45 R. P. M. Part of the reason is that the push-off finger is apt to engage the edges of two records simultaneously due to the thinness of the records thereby resulting in jamming the mechanism or in damage to the records. Accordingly, records of this type are normally changed by different types of changers or attachments engaging the center portion of the record only.

It is one of the objects of the present invention to provide an automatic record changing apparatus in which records of widely differing diameters and thicknesses can be fed by the same mechanism.

According to one feature of the invention, the mechanism automatically compensates for differences in thickness and weight of the records so that the change from one type of record to another can be made with a minimum of adjustment.

According to another feature, the records are supported at their edge portions adjacent the push-off finger by a resilient button whose resilience is such that it will support light, thin records without yielding but will yield under the heavier, thicker records to permit them to drop to a lower level. In this way records of different types are properly supported for accurate engagement by the push-off finger during a changing operation.

The above and other objects and features of the invention will be more readily apparent from the following description when read in connection with the accompanying drawing, in which Figure 1 is a partial side elevation of a record changer embodying the invention shown in position to handle relatively thick, heavy records;

Figure 2 is a similar view showing the mechanism in position to handle relatively light, thin records;

Figures 3 and 4 are partial views on the lines 3—3 of Figure 1 and 4—4 of Figure 2 respectively;

Figures 1, 2, 3, 4, 5:
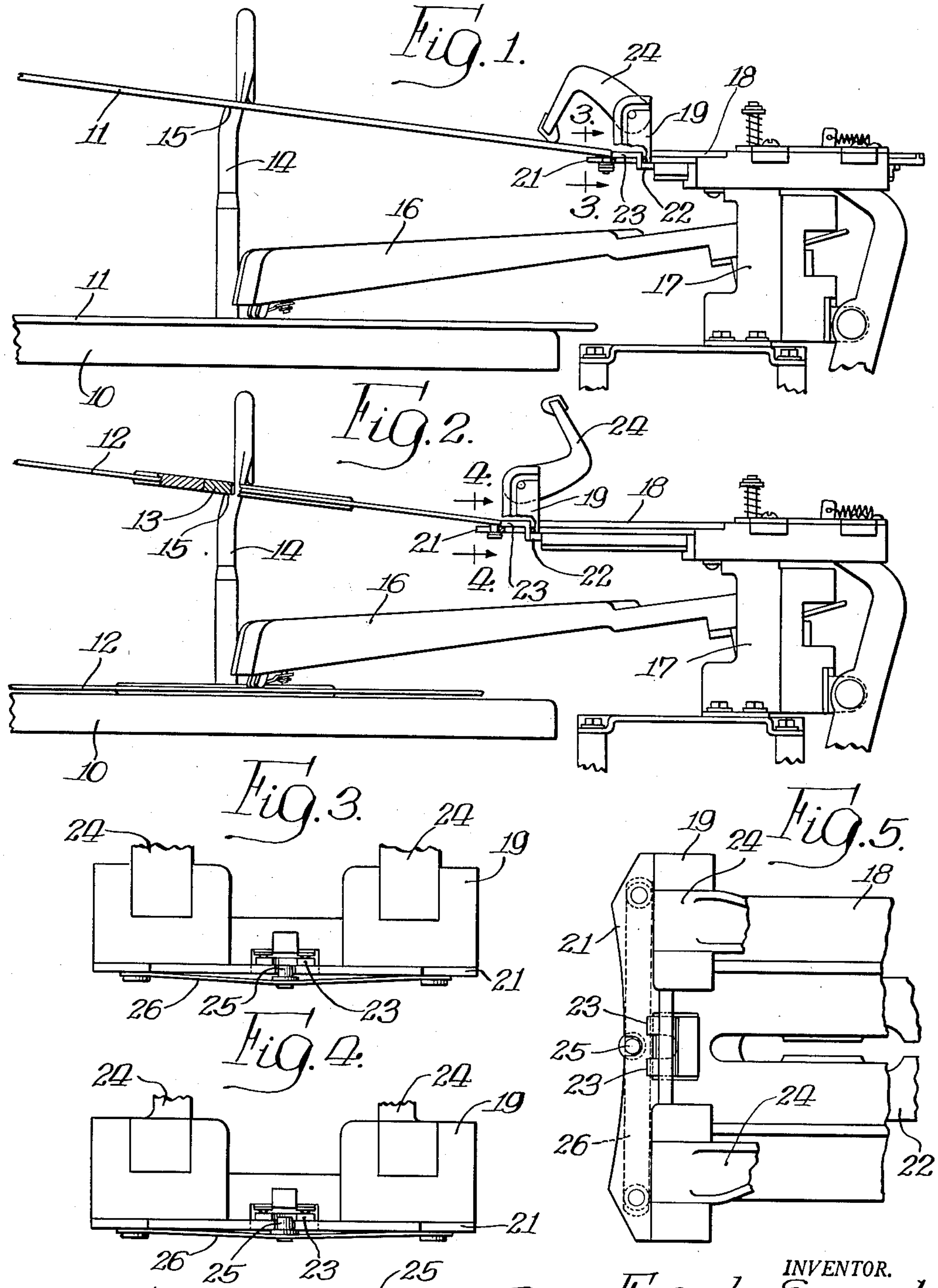
Figure 5 is a partial top plan view of the edge supporting device.
Figure 6:
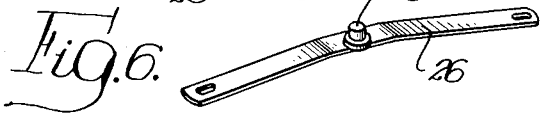
Figure 6 is a perspective view of the resilient button.

The mechanism as partially illustrated in Figures 1 and 2, comprises a turntable 10 on which records can be supported for playing. As shown in Figure 1, the turntable supports a relatively heavy record 11 such as a conventional 10 inch record designed for operation at 78 R. P. M. As shown in Figure 2, the turntable supports a relatively thin, light record 12 of the type designed for operation at 45 R. P. M. Such records are normally provided with an enlarged center opening to fit over a large center post in which the changing mechanism is housed. To utilize records of this type according to the present invention, a center adaptor 13 which may be formed of metal or plastic, is inserted in the large center opening in the record and is provided with a relatively small center opening similar to that in the conventional 78 R. P. M. records. In this way the small, slow speed records can fit over the same center post as the larger higher speed records.

As shown, a stationary center post 14 is provided projecting upward from the center of the turntable and offset between its ends to provide a horizontal supporting shoulder 15. In loading the machine the records are placed over the upper end of the center post or spindle until the lowermost record in a stack engages the shoulder 15. The records are held in this position until they are moved horizontally off of the shoulder 15 at which time they can drop down the spindle onto the turntable.

The records are played by a tone arm 16 mounted for horizontal and vertical pivotal movement in a supporting post 17 at one side of the turntable. Movement of the tone arm during record changing may be effected as more particularly described and claimed in the co-pending application of Olesky and Smardo, Ser. No. 157,092, filed April 20, 1950. Since this mechanism does not form an essential part of the present invention it is not fully disclosed herein.

The edge portions of a stack of records carried on the spindle, are supported by an adjustable supporting plate indicated generally at 18, adjustably carried by the upper part of the post 17. The plate 18 terminates at its forward end in upwardly projecting lugs or brackets 19 beyond which is a horizontal ledge 21 on which the edges of the records are supported. A slide member 22 is slidably mounted at the bottom of the plate and terminates at its end in a split push-off finger 23 which is offset upwardly to extend above the top of the ledge 21. When the slide is moved to the left, as seen in the drawing, through mechanism as fully disclosed in co-pending application Ser. No. 157,092, it will engage the edge of the lowermost record in a stack and push it from the ledge 21. At the same time the record will be moved over so that its central portion moves off of the shoulder 15 so that it can drop down the spindle onto the turntable. The lugs or brackets 19 carry a hold-down member 24 which is pivoted to the brackets 19 on horizontal pivots to swing between an inoperative position as shown in Figure 2, and an operative position as shown in Figure 1. The hold-down member 24 has springs connected thereto normally tending to swing it counter-clockwise to the position of Figure 1, but which swings past center when it is moved to its inoperative position as shown in Figure 2 to hold it in this position.

The mechanism as so far described, is substantially identical with that more particularly disclosed and claimed in application Ser. No. 157,092, and functions in the same manner. For using this mechanism with the standard 7, 10 or 12 inch 78 R. P. M. or 33 R. P. M. records, the plate 18 is adjusted to the proper radial position as shown in Figure 1, and the records are stacked on the center spindle with their edges engaging the ledge 21. Preferably with records of this type, the hold-down member is swung to its operative position to urge the records against the ledge and to hold them properly against accidental tilting.

In operation of the changing mechanism when the slide 22 is moved inward the push-off fingers 23 engage the edge of the lowermost record in the stack and move it to its feeding position in which it will drop onto the turntable. Due to the shape of the center spindle only the lowermost record is moved so that the records are properly fed one at a time.

To use this mechanism with the smaller, lighter records as indicated in Figure 2 due to the thinness of the records the push-off finger would be apt to engage more than one record to result in damage to the mechanism or the records. In records of this type the center is usually thicker than the edges as shown so that the edges normally tend to remain slightly separated. In spite of this and due possibly to slight warping in the records, cases may occur in which the edges of the records are close together so that the push-off finger would engage more than one record.

This difficulty is overcome according to the present invention, by providing a resilient supporting button projecting upward beyond the ledge 21 to support the records in the desired position. As shown, the supporting button comprises a small button member 25 carried by an elongated leaf spring 26 which is secured at its ends to the bottom of the ledge 21. The button 25 projects upward through the notch in the ledge to a point above the top surface of the ledge and will yield resiliently when sufficient force is exerted thereon. In playing the thicker 78 R. P. M. and 33 R. P. M. records the weight of the records is sufficient to depress the button so that the records will rest directly on the upper surface of the ledge 21. This is particularly true when the hold-down member is used as intended so that its force is added to the weight of the records to insure depressing of the button. The position of the button at this time is shown in Figure 3.

When the lighter, thinner records are employed as shown in Figures 2 and 4, their weight is not sufficient to depress the button so that it will remain in its raised position to hold the edge of the lowermost record in a stack slightly above the top surface of the ledge 21. Even when a relatively large stack of such records is employed, the weight acting on the button 25 is still relatively small since the edge portions of the records are normally out of contact with each other so that the major part of their weight is carried by the center post. The height of the button under these conditions is slightly below the tops of the push-off fingers 23 so that when the slide 22 is moved inward the push-off fingers 23 will engage only a single record to effect the changing operation properly and accurately. Preferably the hold-down member 24 is not employed with records of this type since its action would tend to bend the edge portions of the records. Therefore, by properly selecting the strength of the spring 26 the supporting button can be made to support the relatively light, thin records without yielding but to yield under the heavier, thicker types of records. In this way, the same identical mechanism can function in the same manner properly to change records of completely different types.

While one embodiment of the invention has been shown and described in detail, it will be understood that this is illustrative only and it not to be taken as a definition of the scope of the invention, reference being had for this purpose to the appended claims.

I claim:

1. An automatic record changing device for automatically changing records of a first type formed as relatively heavy, thick discs and for automatically changing records of a second type formed as discs relatively light in weight and having thin outer portions, said device including in combination, means for supporting a stack of records of one of said first and second types including a supporting ledge having a surface for supporting the edge of the bottom record in said stack, sliding means on said supporting ledge extending above said surface by an amount substantially equal to the thickness of said records of said first type, said sliding means being movable to a position engaging the lower record in said stack of records to push said lower record off said supporting ledge, resilient supporting means having a portion extending from said surface of said supporting ledge and engaging said lower record supported on said ledge, said supporting means being constructed to have resilience such that it yields when engaged by the edge of a record of said first type and remains substantially unyielding when engaged by the edge of a record of said second type, so that said portion is held substantially flush with said surface of said supporting ledge when a record of said first type is supported thereon and said portion holds the edge of a record of said second type in a position substantially in alignment with said sliding means.

2. An automatic record changing device for automatically changing records of a first type composed of relatively heavy, thick discs and for automatically changing records of a second type composed of relatively thin discs relatively light in weight, said device including in combination, a horizontally disposed turntable for supporting a record to be played, a spindle extending upward from the center of said turntable and being offset horizontally intermediate its ends to form a record supporting shoulder, a supporting ledge lying at the side of the spindle toward which it is offset, said ledge having a surface for supporting the bottom record in a stack of records of one of said first and second types, sliding means on said supporting ledge extending above said surface by an amount substantially equal to the thickness of said records of said first type, said sliding means being engageable with the edge of the lower record in a stack of records to push said lower record off said supporting ledge, resilient supporting means having a portion extending above said surface of said supporting ledge and engaging said bottom record, said supporting means having resilience such that it yields under the weight of a record of said first type and remains substantially unyielding under the weight of a record of said second type, so that said resilient supporting member is held substantially flush with said surface of said supporting ledge when a record of said first type is supported thereon and a record of said second type supported on said ledge is held in a position substantially in alignment with said sliding means, a hold down member adapted to be moved to a position in engagement with the top record of said stack, said hold down member being operable to insure depression of said resilient supporting means by a record of said first type.

3. Automatic record changing apparatus for automatically changing records of a first type composed of relatively heavy, thick discs and for automatically changing records of a second type composed of thinner discs relatively light in weight, said apparatus including in combination, means to support a plurality of records of one of said first and second types with said records resting one above the other, said support means including a horizontal ledge for support of the lowermost record of said plurality, sliding means on said shelf extending above said ledge by an amount substantially equal to the thickness of a record of the first type, said sliding means being engageable with the edge of said lowermost record to remove it slideably from said ledge, a resilient device with a portion normally extending above the surface of said horizontal shelf and engaging said lowermost record, said device having resilience such that a record of the first type depresses said resilient device to a position substantially flush with the surface of said support means and such that a record of the second type is held by said resilient device in a position in substantial alignment with said sliding means, and resilient hold down means including a portion engageable with the top record of said plurality to press said plurality of records against said horizontal shelf, said hold down means including mounting means selectively holding said portion thereof in operative and inoperative positions.

References Cited in the file of this patent

UNITED STATES PATENTS

| | | |
|---|---|---|
| 2,374,080 | Dale | Apr. 17, 1945 |
| 2,435,264 | Ansar | Feb. 3, 1948 |
| 2,502,208 | Dale | Mar. 28, 1950 |
| 2,545,359 | Johnson | Mar. 13, 1951 |